United States Patent
Inagaki (10) Patent No.: US 9,693,087 B2
(45) Date of Patent: Jun. 27, 2017

(54) COMMUNICATION APPARATUS, CONTROL METHOD, AND RECORDING MEDIUM

(71) Applicant: CANON KABUSHIKI KAISHA, Tokyo (JP)

(72) Inventor: Kensuke Inagaki, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 99 days.

(21) Appl. No.: 14/169,676

(22) Filed: Jan. 31, 2014

(65) Prior Publication Data
US 2014/0218267 A1   Aug. 7, 2014

(30) Foreign Application Priority Data
Feb. 6, 2013   (JP) .................... 2013-021796

(51) Int. Cl.
| | | |
|---|---|---|
| H04N 21/41 | (2011.01) | |
| G09G 3/00 | (2006.01) | |
| H04N 9/31 | (2006.01) | |
| H04N 21/436 | (2011.01) | |
| G06F 3/14 | (2006.01) | |

(52) U.S. Cl.
CPC ......... *H04N 21/4122* (2013.01); *G09G 3/002* (2013.01); *H04N 9/3179* (2013.01); *H04N 21/4126* (2013.01); *H04N 21/43615* (2013.01); *G06F 3/1454* (2013.01); *G09G 2320/103* (2013.01); *G09G 2370/025* (2013.01)

(58) Field of Classification Search
None
See application file for complete search history.

(56) References Cited

U.S. PATENT DOCUMENTS

| | | | | |
|---|---|---|---|---|
| 6,121,970 A * | 9/2000 | Guedalia | ........... | G06F 3/14 715/234 |
| 8,599,275 B2 * | 12/2013 | Kashiwa | ........... | G11B 27/034 348/211.3 |
| 2003/0058271 A1 * | 3/2003 | Van Der Meulen | ........... | G06F 17/30017 715/738 |
| 2003/0081561 A1 * | 5/2003 | Hsiao | ........... | H04L 27/0002 370/310 |
| 2003/0093469 A1 * | 5/2003 | Ohta | ........... | G06F 3/14 709/203 |
| 2003/0169932 A1 * | 9/2003 | Li | ........... | G06T 9/00 382/239 |
| 2004/0071453 A1 * | 4/2004 | Valderas | ........... | G11B 27/105 386/333 |

(Continued)

FOREIGN PATENT DOCUMENTS

| | | |
|---|---|---|
| JP | 2003-006128 A | 1/2003 |
| JP | 2007-199983 A | 8/2007 |
| JP | 2011-053890 A | 3/2011 |

*Primary Examiner* — Nelson Rosario
*Assistant Examiner* — Nathan Brittingham
(74) *Attorney, Agent, or Firm* — Cowan, Liebowitz & Latman, P.C.

(57) ABSTRACT

The communication apparatus obtains a projection image to be projected. In a case where a change from a first projection image to a second projection image has been detected, the communication apparatus distributes second distribution data based on the second projection image to an external apparatus. In a case where the second distribution data has already been distributed, the communication apparatus controls not to distribute data based on the second projection image as new distribution data.

13 Claims, 9 Drawing Sheets

(56) References Cited

U.S. PATENT DOCUMENTS

| | | | |
|---|---|---|---|
| 2004/0205506 A1* | 10/2004 | Clark | G06F 17/2241 715/208 |
| 2006/0233520 A1* | 10/2006 | Jung | H04N 7/163 386/231 |
| 2007/0195211 A1* | 8/2007 | Fujimori | G06F 3/1415 349/5 |
| 2008/0187230 A1* | 8/2008 | Yokoyama | H04N 19/507 382/209 |
| 2012/0106852 A1* | 5/2012 | Khawand | H04N 19/619 382/218 |
| 2013/0291073 A1* | 10/2013 | Dec | G06F 21/41 726/5 |

* cited by examiner

FIG. 5A 0001.png

FIG. 5B

```
<html>

<head>
  <title>0001</title>
 </head>

<body>
  <table>
   <tr>
    <td valign="top"><ui>
    <li><b>0001</b></li>
    </ui></td>
    <td><img src="0001.png"></td>
   </tr>
  </table>
 </body>

</html>
```

0001.html

FIG. 5C

BROWSING RESULTS BY BROWSER

FIG. 6A

SUMMARY OF ○✕ PRESENTATION

■ PURPOSE
■ MEANS
■ RESULTS
■ CONSIDERATION
■ CONCLUSION 0002.png

FIG. 6B

```
<html>

<head>
    <title>0002</title>
  </head>

<body>
    <table>
      <tr>
        <td valign="top"><ui>
        <li><a href="./0001.html">0001</a></li>    601
        <li><b>0002</b></li>
        </ui></td>
        <td><img src="0002.png"></td>
      </tr>
    </table>
  </body>

</html>
```

0002.html

FIG. 6C

BROWSING RESULTS BY BROWSER

FIG. 7A

```
<html>

<head>
  <title>0001</title>
 </head>

<body>
  <table>
   <tr>
    <td valign="top"><ui>
    <li><b>0001</b></li>
    <li><a href="./0002.html">0002</a></li>    701
    </ui></td>
    <td><img src="0001.png"></td>
   </tr>
  </table>
 </body>

</html>
```

UPDATED 0001.html

FIG. 7B

BROWSING RESULTS BY BROWSER

COMMUNICATION APPARATUS, CONTROL METHOD, AND RECORDING MEDIUM

BACKGROUND OF THE INVENTION

Field of the Invention

The present invention relates to a communication apparatus and a control method, and particularly to a technique of distributing a projection image to be projected by a projecting apparatus.

Description of the Related Art

In making a presentation using electronic data, a method of projecting the electronic data by a projector has been used. By projecting electronic data by a projector, the contents of the electronic data can be presented to the audience that can visually recognize the projected image projected on a projection surface such as a screen.

There have however been some cases where an audience staying far away from the projection surface can visually recognize that electronic data is being projected but cannot visually recognize the detailed contents of the electronic data failing to grasp the contents. In order to make the contents of the electronic data visually recognizable even to such an audience, there is a technique of converting electronic data previously uploaded by the presenter to a universal format displayable on various types of terminals and distributing the converted electronic data (Japanese Patent Laid-Open No. 2007-199983 and No. 2011-53890).

However, in converting electronic data to a format displayable on various types of terminals as in the cited patent documents as described above, the presenter or the organizer of the presentation must provide a server, etc. for conversion. That is, the cost of installing a server having the conversion capability will be necessary in addition to the normal set-up cost, placing a financial burden on the presenter or the organizer.

SUMMARY OF THE INVENTION

The present invention was made in view of such problems in the conventional technique. The present invention provides a communication apparatus that distributes a projection image to be projected by a projecting apparatus at low cost and a control method for the same.

The present invention in its first aspect provides a communication apparatus comprising: an obtaining unit that obtains a projection image to be projected by a projecting unit; a storing unit that stores the projection image obtained by the obtaining unit; a generating unit that generates distribution data for distributing the projection image stored by the storing unit to an external apparatus; a detecting unit that detects a change of the contents of the projection image obtained by the obtaining unit; a distributing unit that, in a case where a change from a first projection image to a second projection image has been detected by the detecting unit, distributes second distribution data based on the second projection image to an external apparatus; and a control unit that, in a case where the second distribution data has already been distributed by the distributing unit, controls not to distribute data based on the second projection image as new distribution data.

The present invention in its second aspect provides a control method for a communication apparatus, comprising: obtaining a projection image to be projected by a projecting unit; storing the obtained projection image; generating distribution data for distributing the stored projection image to an external apparatus; detecting a change of the contents of the obtained projection image; in a case where a change from a first projection image to a second projection image has been detected, distributing second distribution data based on the second projection image to an external apparatus; and in a case where the second distribution data has already been distributed, controlling not to distribute data based on the second projection image as new distribution data.

Further features of the present invention will become apparent from the following description of exemplary embodiments (with reference to the attached drawings).

DESCRIPTION OF THE EMBODIMENTS

First Embodiment

An example embodiment of the present invention will be described hereinafter in detail with respect to the relevant drawings. In the embodiment described hereinafter, the invention will be applied to a liquid crystal projector having a Web server function capable of disclosing an HTML file for displaying a projection image, as an example of the communication apparatus. It should however be noted that the invention is applicable to any type of equipment capable of disclosing a file for displaying a projection image. Note also that, in the following description, the "projection image" as used herein refers to an image as the object to be projected using the liquid crystal projector, and the "projected image" refers to an image corresponding to the projection image projected by the liquid crystal projector.

<<Configuration of Liquid Crystal Projector 100>>

Figure 1:
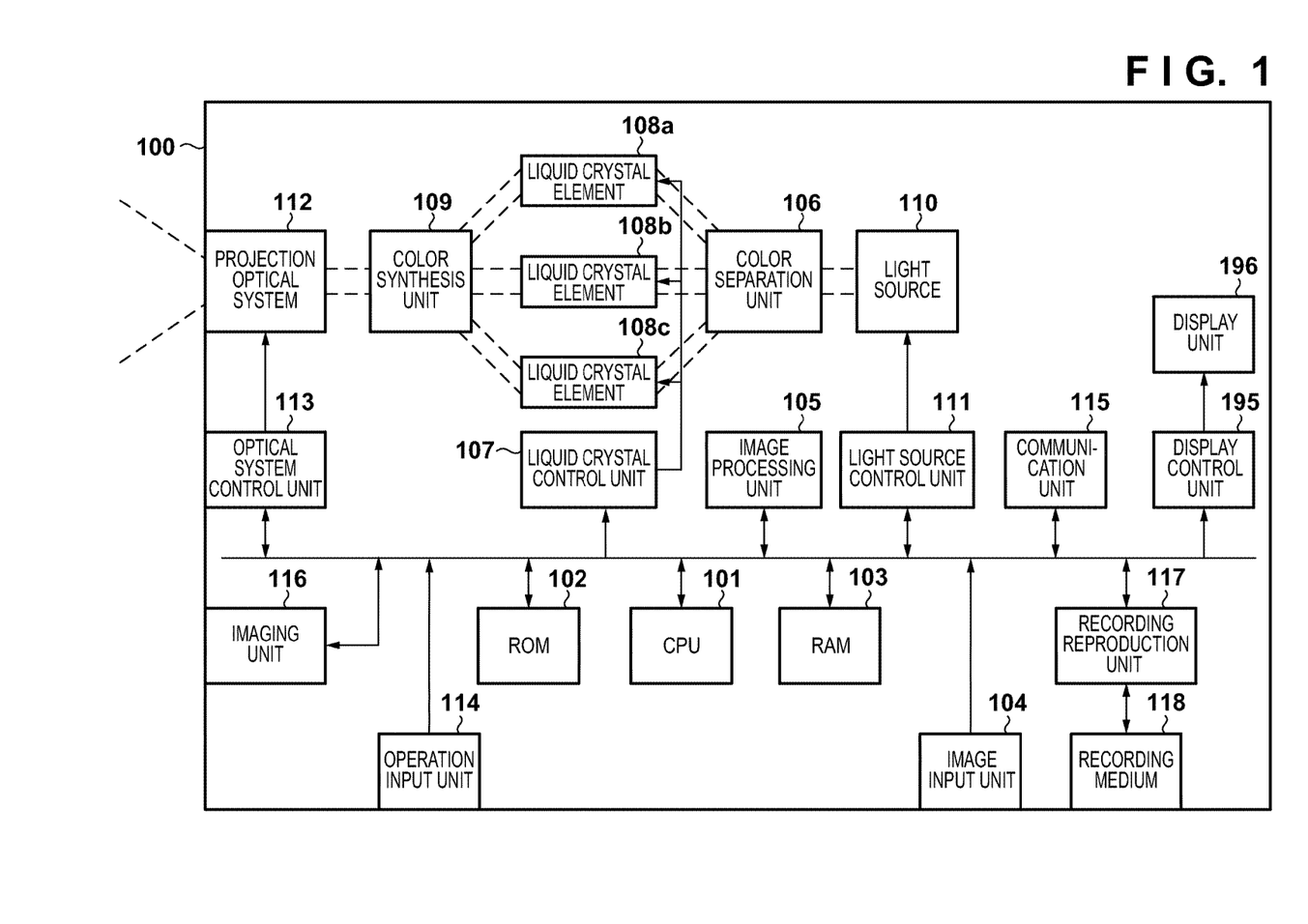
FIG. 1 is a block diagram showing a functional configuration of a liquid crystal projector 100 of an embodiment of the present invention.

FIG. 1 is a block diagram showing a functional configuration of the liquid crystal projector 100 of the embodiment of the invention.

A CPU 101 controls the operations of the blocks of the liquid crystal projector 100. Specifically, the CPU 101 controls the operations of the blocks by reading operation programs for the blocks stored in a ROM 102, loading the programs in a RAM 103, and executing the programs.

The ROM 102 is a rewritable nonvolatile memory, for example. The ROM 102 stores, in addition to the operation programs of the blocks of the liquid crystal projector 100, information such as parameters required for the operations of the blocks. The RAM 103 is a volatile memory. The RAM 103 is used, not only as the area where the operation programs of the blocks are loaded, but also as the storage area where intermediate data, etc. output during the operations of the blocks are stored.

An image input unit 104 is an input interface of the liquid crystal projector 100 for receiving input of a projection image. The interface of the image input unit 104 may have terminals such as a composite terminal, an S-video terminal, a D terminal, component terminals, an analog RGB terminal, a DVI-I terminal, a DVI-D terminal, an HDMI (registered trademark) terminal, for example. Note that, when having received an analog image signal, the image input unit 104 is supposed to convert the input analog image signal to a digital image signal.

An image processing unit 105 applies various types of image processing to the image signal of the projection image input into the liquid crystal projector 100 via the image input unit 104. Specifically, the image processing unit 105 applies processing of changing the number of frames, the number of pixels, the image shape, etc. to the image signal of the projection image. The image processing unit 105 may also apply processing such as frame thinning processing, frame interpolation processing, resolution conversion processing, distortion correction processing (keystone correction processing), etc. to the projection image. Note that the object image to be processed by the image processing unit 105 is not limited to the image signal input into the liquid crystal projector 100 via the image input unit 104, but may be an image signal read from a recording medium 118 to be described later and an image signal taken by an imaging unit 116.

The liquid crystal projector 100 of this embodiment has three kinds of liquid crystal elements 108a, 108b, and 108c for R component, G component, and B component that form an image to be projected. In each of the pixels of the liquid crystal elements 108, the light amounts passing through the elements are controlled by a liquid crystal control unit 107 based on the pixel values for the components of the image to be projected. Specifically, the liquid crystal control unit 107 adjusts the light transmission amounts by controlling the voltages applied to the liquid crystal elements in each pixel, to form an projected image corresponding to the image to be projected by the light having passed through the liquid crystal elements 108.

The light beams incident on the liquid crystal elements 108 are emitted from a light source 110. The light source 110 may be a white LED, a halogen lamp, a xenon lamp, a high-pressure mercury lamp, etc., and the light amount is controlled by a light source control unit 111. The light beam emitted from the light source 110 is input into a color separation unit 106 such as a dichroic mirror, a prism, etc., for example, to be separated into light beams of the RGB components, and the separated light beams reach the corresponding liquid crystal elements 108. Note that the light source 110 is described as emitting white light in this embodiment. It is however needless to mention that, if LED light sources corresponding to the respective color components are provided as the light source 110, the color separation unit 106 will be unnecessary.

The light beams having passed through the liquid crystal elements 108 are input into a color synthesis unit 109, and then reach a projection optical system 112 as a combined light beam, of the light beams of the color components, that corresponds to the image to be projected. Like the color separation unit 106, the color synthesis unit 109 may be a dichroic mirror or a prism.

The projection optical system 112 is made of one or more lenses, etc. The projection optical system 112 operates to focus the input light beam on a projection surface to form an image by changing the lens position under drive control by an optical system control unit 113. Note that the control by the optical system control unit 113 is not limited to the focusing, but may be for scaling up or down of the projected image.

An operation input unit 114 is a user interface of the liquid crystal projector 100, such as a menu switch and a touch panel. Once detecting an operation input by the user, the operation input unit 114 transfers a control signal corresponding to the operation input to the CPU 101. Note that the operation input unit 114 may be one that detects a wireless signal received from an external apparatus such as a remote controller.

A communication unit 115 is a communication interface with an external apparatus, of the liquid crystal projector 100 of this embodiment, such as wireless LAN, wired LAN, USB, Bluetooth (registered trademark), etc. When the liquid crystal projector 100 functions as a Web server, transmission of an HTML file, etc. are performed in response to an request from an external apparatus connected via the communication unit 115. Note that, if the input interface of the image input unit 104 is an HDMI (registered trademark) terminal, the communication unit 115 may perform CEC communication via the image input unit 104.

The imaging unit 116, which has an imaging element such as a CCD and a CMOS sensor, takes an image of an object and outputs the corresponding image signal. The imaging unit 116 is placed to take an image of the projected image projected on the projection surface by the liquid crystal projector 100 for the purpose of distortion correction processing in the image processing unit 105, for example.

The recording medium 118 is a recording device removably connected to the liquid crystal projector 100, such as an embedded memory embedded in the liquid crystal projector 100, a memory card, and a HDD. When an image or a moving image recorded in the recording medium 118 is to be projected by the liquid crystal projector 100, such an image or moving image recorded in the recording medium 118 is read by a recording reproduction unit 117.

<<Projection Processing>>

Figure 2:
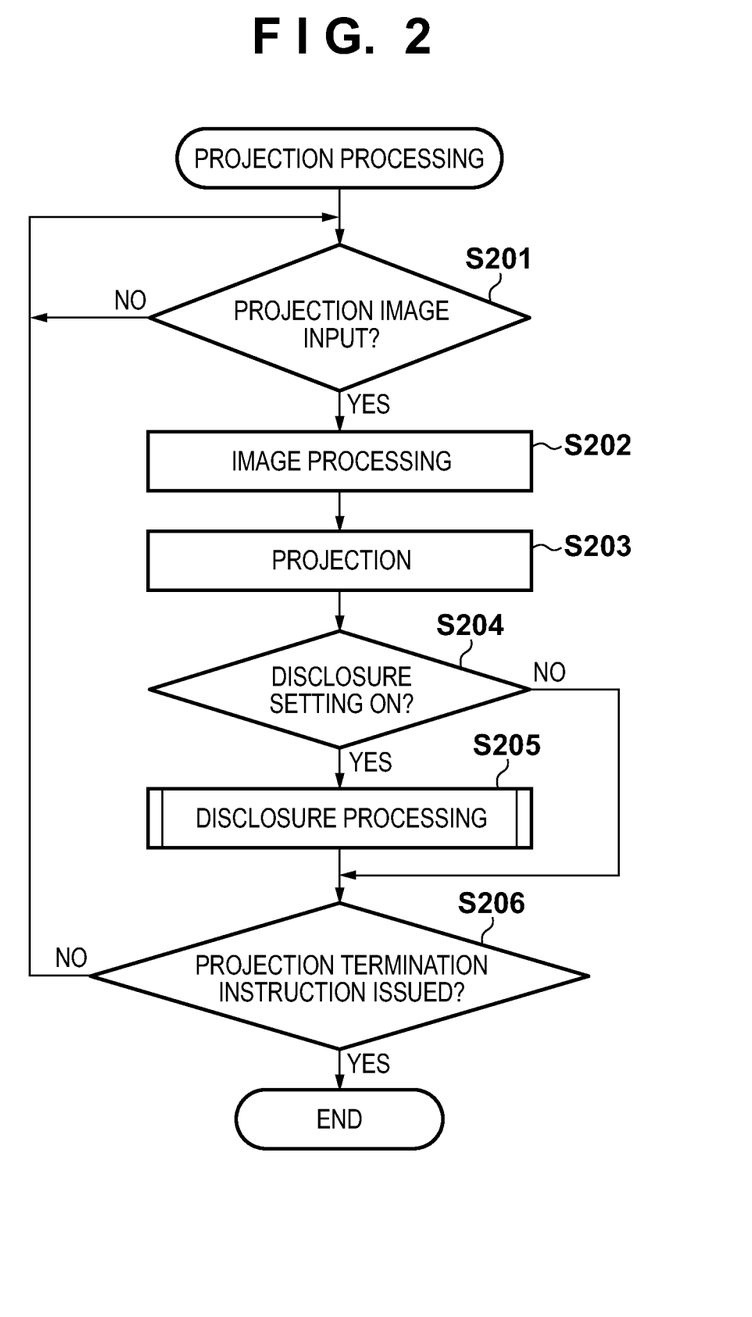
FIG. 2 is a flowchart showing an example of projection processing executed by the liquid crystal projector 100 of the embodiment of the invention.

The projection processing by the liquid crystal projector 100 of this embodiment having the above-described configuration will be described concretely with reference to the flowchart in FIG. 2. The processing corresponding to this flowchart can be achieved by the CPU 101 reading the corresponding processing program stored in the ROM 102, loading the program in the RAM 103, and executing the program. Note that this projection processing will be described as being started at the startup of the liquid crystal projector 100, for example. Note also that the image signal of the projection image is described as being input via the image input unit 104 from an external apparatus connected to the liquid crystal projector 100. However, the way of input of the projection image may not be via the image input unit 104 as described above.

In S201, the CPU 101 determines whether or not a projection image has been input into the image input unit 104. The CPU 101 shifts the processing to S202 if determining that a projection image has been input into the image input unit 104, or repeats the processing of this step if determining that no projection image has been input.

In S202, the CPU 101 allows the image processing unit 105 to apply predetermined image processing to the input projection image.

In S203, the CPU 101 projects the projection image subjected to the image processing by the image processing unit 105. Specifically, the CPU 101 transfers the projection image subjected to the image processing to the liquid crystal control unit 107, to allow the liquid crystal control unit 107 to control the liquid crystal elements 108a to 108c according to the image and project the image on the projection surface via the projection optical system 112.

In S204, the CPU 101 determines whether or not the setting of disclosing the contents of the projection image using the Web server function is on at present. When the liquid crystal projector 100 functions as a Web server, it can present the image corresponding to the projection image to an external apparatus that has accessed the server by executing disclosure processing to be described later.

Figure 3:
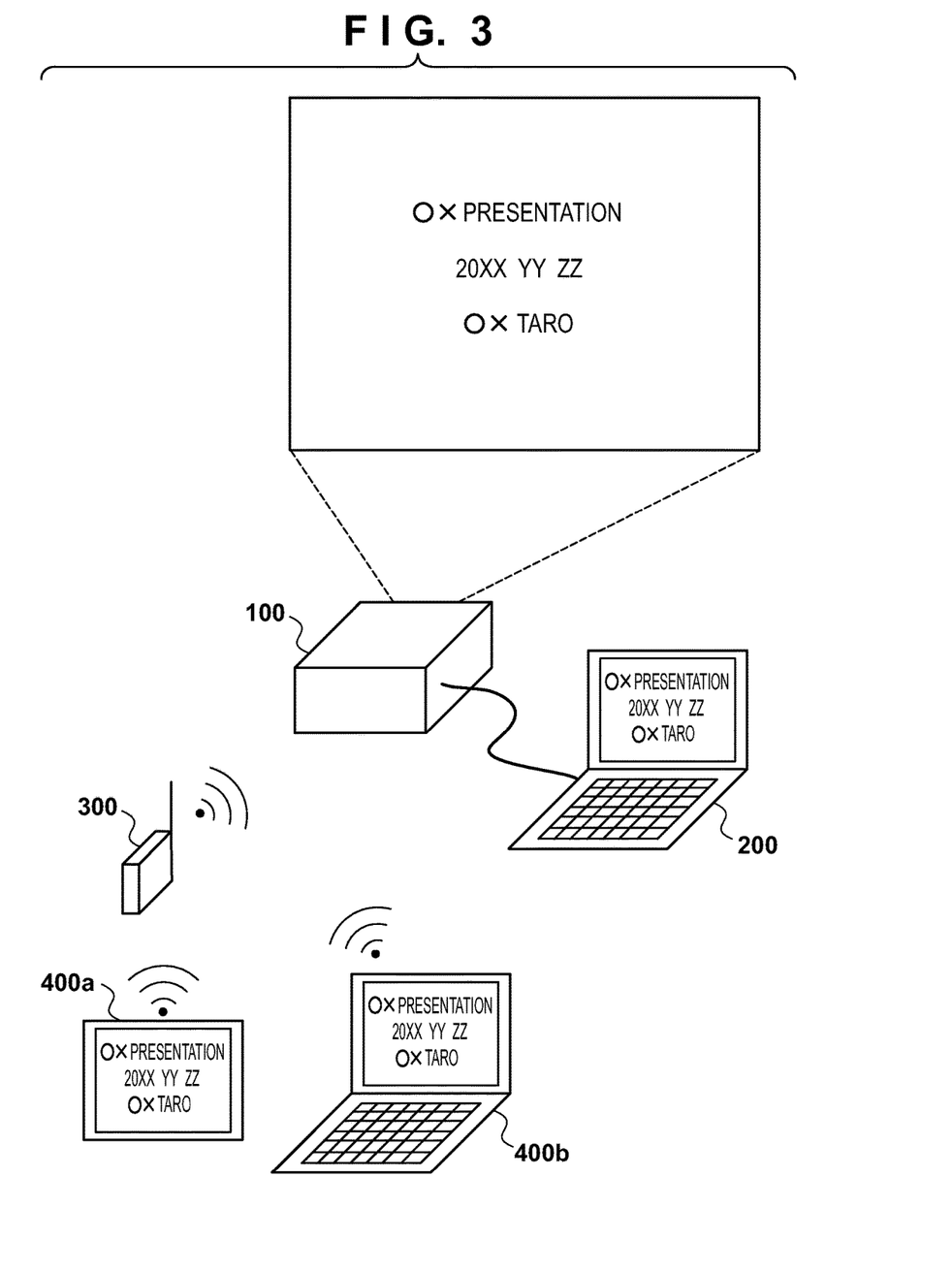
FIG. 3 is a view showing a system configuration of the embodiment of the invention.

For example, as shown in FIG. 3, assume the case that a projection image is input from a PC 200 into the liquid crystal projector 100. In this embodiment, if the liquid crystal projector 100 functions as a Web server, an area of the ROM 102, for example, is used as an area for storing an HTML file and an image file for disclosure. Also, the liquid crystal projector 100 is connected to a predetermined network via the communication unit 115. The users of external apparatuses 400a and 400b can access a file that is under disclosure by using a Web browsing application in their apparatuses and issuing an request via a network-connected access point 300.

The CPU 101 shifts the processing to S205 if determining that the setting of disclosing the contents of the projection image using the Web server function is on at present, or to S206 if determining that it is not on.

In S205, the CPU 101 executes the disclosure processing of disclosing the contents of the projection image using the Web server function.

<Disclosure Processing>

Figure 4:
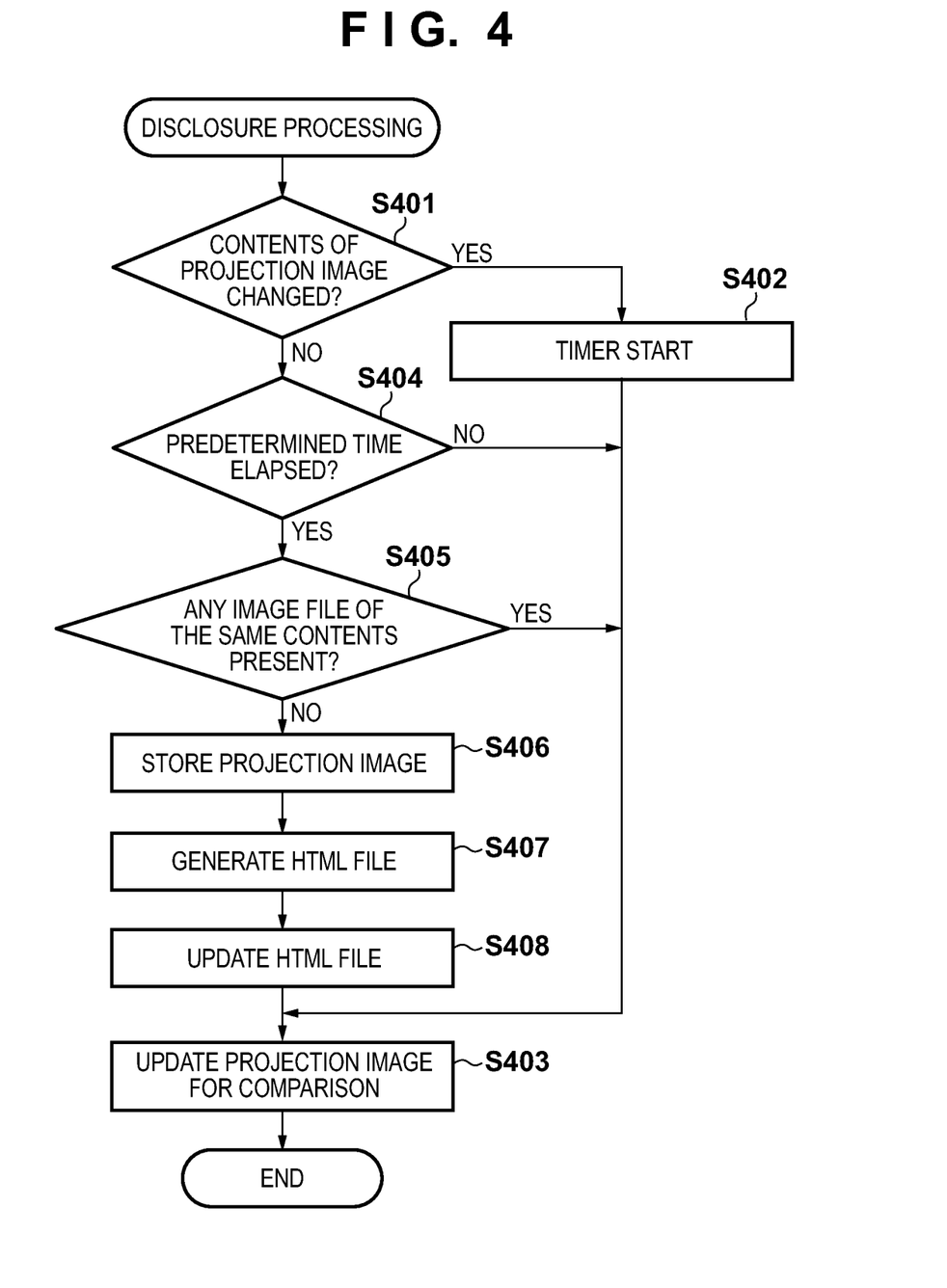
FIG. 4 is a flowchart showing an example of disclosure processing executed by a liquid crystal projector 100 of the first embodiment of the invention.

The disclosure processing executed by the liquid crystal projector 100 of this embodiment will be described hereinafter in detail with reference to the flowchart in FIG. 4.

In S401, the CPU 101 determines whether or not the contents of the projection image have changed. Specifically, the CPU 101 compares the projection image input via the image input unit 104 (input projection image) with the projection image immediately previously input via the image input unit 104 and stored in the RAM 103 (previous projection image), to determine whether the former has changed in contents from the latter. In the liquid crystal projector 100 of this embodiment, the projection image is stored in the ROM 102 as an image file to be disclosed using the Web server function. At this time, the CPU 101 stores the projection image as an image file only when having detected that the contents of the projection image have changed to avoid a projection image of the same contents from being stored each time. The CPU 101 shifts the processing to S402 if determining that the contents of the projection image have changed, or to S404 if determining that they have not changed. Note that, if there is no projection image stored in the ROM 102, the CPU 101 is supposed to shift the processing to S402.

In S402, the CPU 101 resets a timer for measuring the time during which projection images of the same contents are being input, to start the measurement. The timer may be hardware one provided inside the liquid crystal projector 100, or may be software one performing counting in a program.

In S403, the CPU 101 updates the previous projection image stored in the RAM 103 to the input projection image for the determination of a change of the projection image in S401 in the execution of the next disclosure processing, and completes the disclosure processing.

In S404, the CPU 101 determines whether or not a predetermined time has elapsed since the contents of the input projection image have changed. That is, determined is whether or not the state where projection images of the same contents as the input projection image at the time of start of measurement in S402 are being input has continued for a predetermined time. In the liquid crystal projector 100 of this embodiment, in order to prevent the projection image from being stored each time of change of the projection image that may frequently occur due to a malfunction, etc. resulting in a number of images becoming the object to be disclosed, the projection image is stored as an image file once the change of the projection image to be projected has been stabilized. In other words, the CPU 101 stores the projection image as an image file once the contents of the projection image are the same for a predetermined time. The CPU 101 shifts the processing to S405 if determining that a predetermined time has elapsed since the contents of the projection image have changed, or to S403 if determining that it has not elapsed.

In S405, the CPU 101 determines whether or not the input projection image is the same in contents as the image already disclosed as an image file. In the liquid crystal projector 100 of this embodiment, the projection image is supposed to be stored in the RAM 103 concurrently when being stored in the ROM 102 as an image file. In this step, the CPU 101 determines whether or not an image file having the same contents has already been disclosed by comparing the input projection image with the projection image stored in the RAM 103 (existing projection image) that corresponds to the image file in the ROM 102. In this way, it is possible to avoid duplicate image files from being disclosed using the Web server function of the liquid crystal projector 100. The CPU 101 shifts the processing to S403 if determining that the input projection image is the same in contents as an image already disclosed as an image file, or to S406 if determining that it is not the same.

In S406, the CPU 101 transfers the input projection image to the image processing unit 105, to allow the image processing unit 105 to convert the input projection image to an image file according to a predetermined file format and store the image file in the ROM 102. The image file is supposed to have a file name uniquely identifying the file, such as "0001.png". It is presumed that numeric strings numbered in the order of projection will be displayed by HTML files for browsing so that the browser can grasp the order of projection at the time of browsing. Therefore, it is preferable that files and generated HTML files, which will be described later, have their file names including such numeric strings. Note that the predetermined file format is supposed to be a universal file format accessible by external apparatuses, such as bit mapping and JPEG.

Figure 5A:
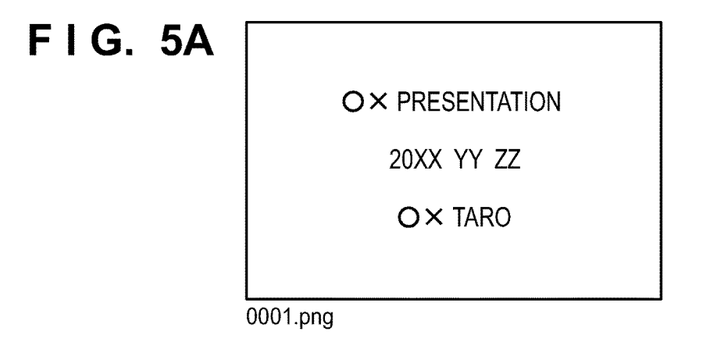
FIGS. 5A, 5B, and 5C are a first set of views for explaining an HTML file for displaying a projection image according to the first embodiment of the invention.

In S407, the CPU 101 generates an HTML file for displaying the image file stored in S406, and stores the HTML file in the ROM 102. For example, an image file "0001.png" as shown in FIG. 5A is displayed as shown in FIG. 5C by an HTML file "0001.html" described as shown in FIG. 5B when being read by an external apparatus.

Figure 5B:
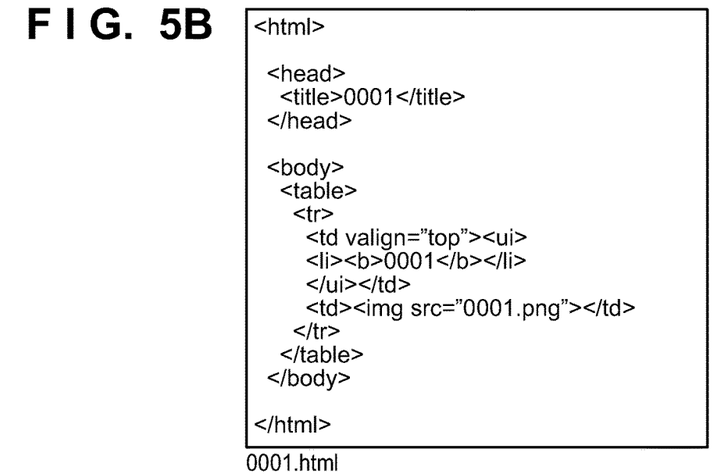
Figure 5C:
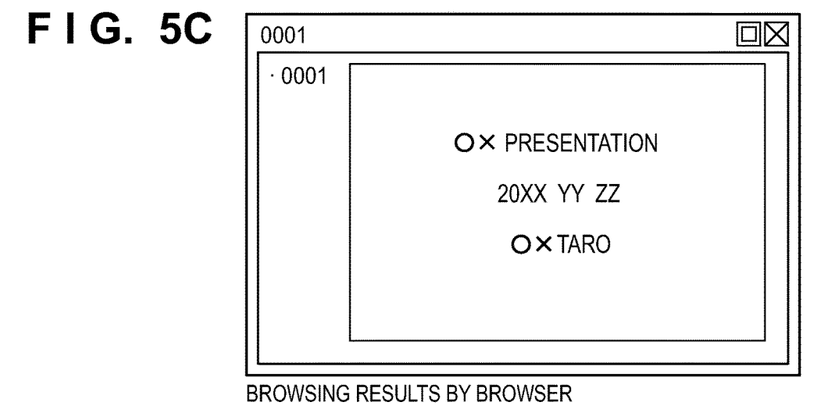
Figure 6A:
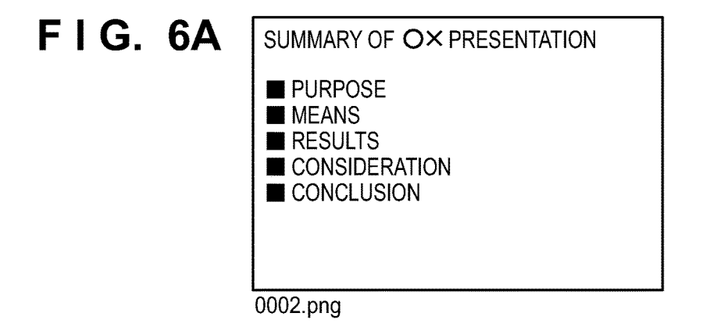
FIGS. 6A, 6B, and 6C are a second set of views for explaining an HTML file for displaying a projection image according to the first embodiment of the invention.
Figure 6B:
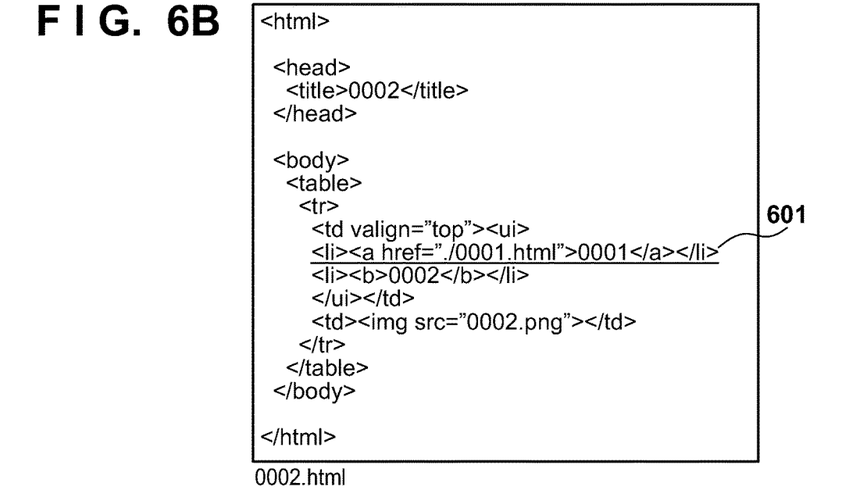
Figure 6C:
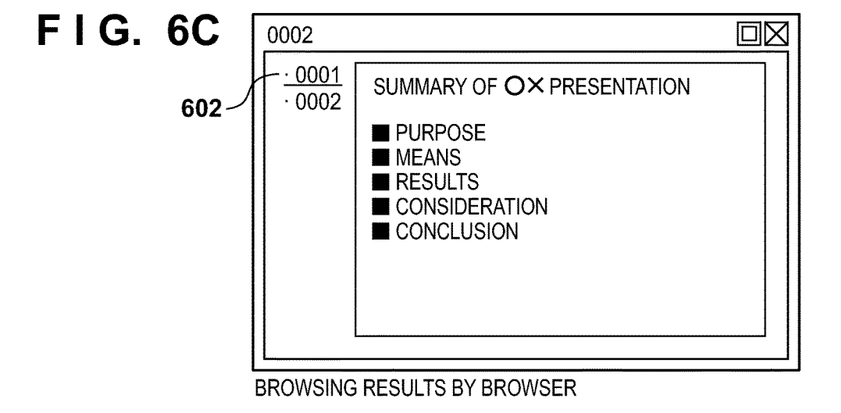

The example in FIG. 5B shows an HTML file generated for the first time when any image file corresponding to the input projection image is not present in the ROM 102. By contrast, if an image file corresponding to the input projection image is present in the ROM 102, an HTML file "0002.html" including a description of a link to another HTML file as shown in FIG. 6B, for example, is generated in this step. The HTML file in FIG. 6B includes a description 601 of a link to the "0001.html" file shown in FIG. 5B, for example, in addition to a description for displaying an image file "0002.png" as shown in FIG. 6A. By this linking, the HTML file "0002.html" is displayed including a link 602 to a Web page specified by the HTML file "0001.html" for displaying the image file "0001.png," as shown in FIG. 6C, when being read by an external apparatus.

Figure 7A:
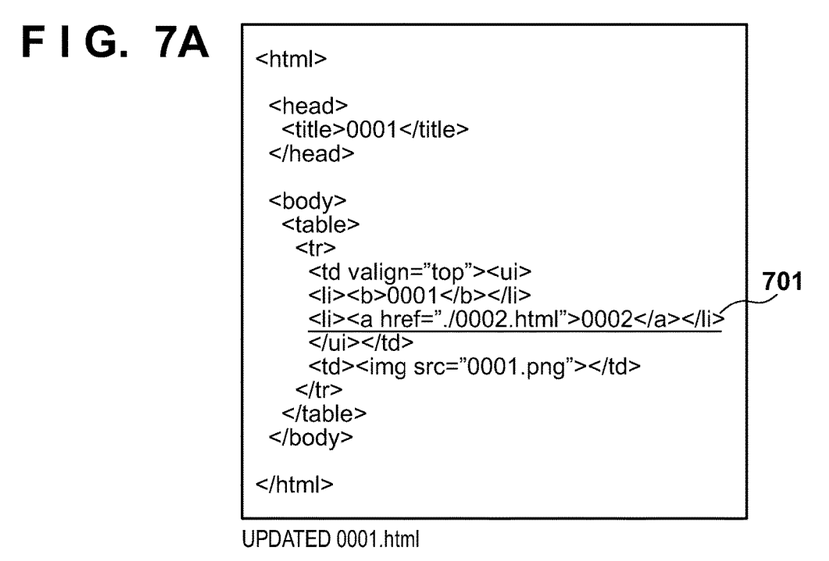
FIGS. 7A and 7B are a third set of views for explaining an HTML file for displaying a projection image according to the first embodiment of the invention.
Figure 7B:
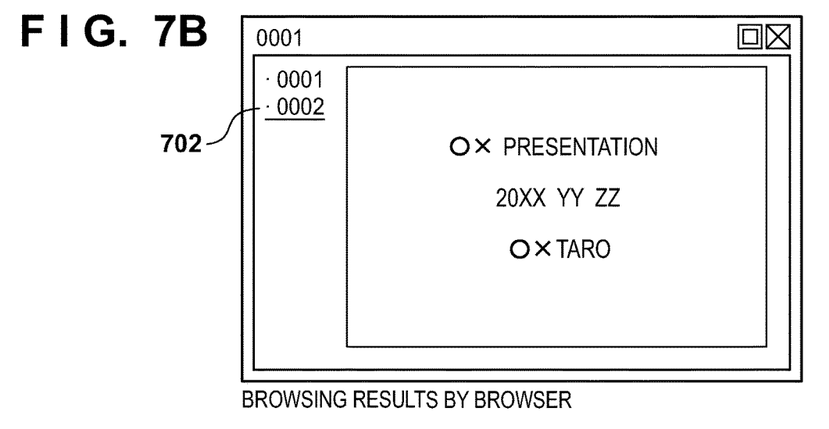

In S408, the CPU 101 updates any HTML file other than the HTML file newly generated in S407 that is stored in the ROM 102 by adding a description of a link to the newly generated HTML file, and then shifts the processing to S403. For example, when the HTML file "0002.html" in FIG. 6B is newly generated, a description 701 of a link to "0002.html" is added to the HTML file "0001.html" in FIG. 5B as shown in FIG. 7A. The HTML file "0001.html" updated as described above is displayed including a link 702 to a Web page that displays the image file "0002.png," as shown in FIG. 7B, when being read by an external apparatus. In this way, by linking, the user can move among all HTML files that are being disclosed. Note that, although the example of two HTML files being combined by linking is shown in FIGS. 5A to 7B, this linking is also applicable to three or more HTML files, in which each of such HTML files may be updated to include links to all of the remaining HTML files.

Figure 8A:
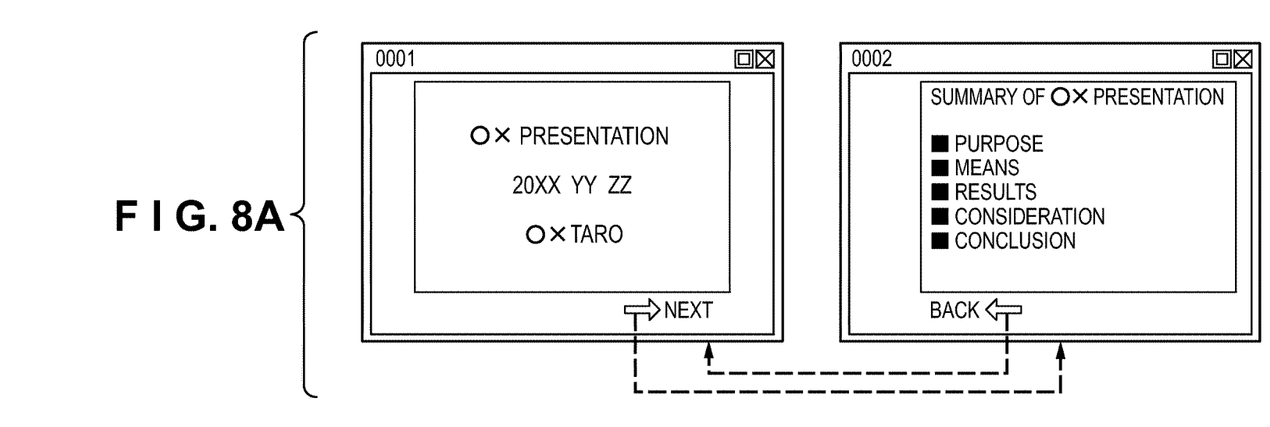
FIGS. 8A and 8B are fourth set of views for explaining an HTML file for displaying a projection image according to the first embodiment of the invention.
Figure 8B:
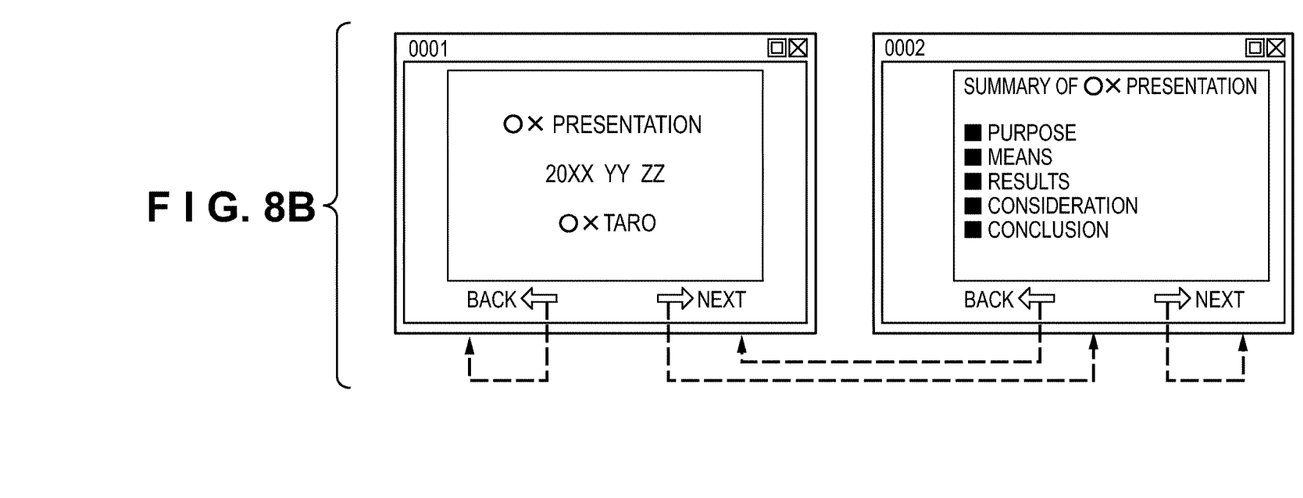

By executing the disclosure processing as described above, the liquid crystal projector 100 of this embodiment can disclose an HTML file capable of displaying an image corresponding to the projection image, in response to a change in projection image, so as to be accessible from an external apparatus. Note that the display screens specified by the HTML files demonstrated with reference to FIGS. 5A to 7B are mere examples. Alternatively, as shown in FIGS. 8A and 8B, for example, icon images indicating page movements may be used to be movable among pages. In this case, as shown in FIG. 8A, the HTML file may be configured not to display an icon image when there is no preceding or following HTML file in the order of projection. Otherwise, as shown in FIG. 8B, the HTML file may be configured so that, while an icon image is displayed, the HTML file itself will be the link destination.

Once the disclosure processing is completed, the CPU 101 determines whether or not a projection termination instruction has been issued in S206 of the projection processing. Specifically, the CPU 101 determines the presence/absence of the instruction by whether or not having received a control signal corresponding to the projection termination instruction from the operation input unit 114. The CPU 101 completes the projection processing if determining that the projection termination instruction has been issued, or returns the processing to S201 if determining that it has not been issued.

Note that, considering the case that the contents of a presentation using the projecting apparatus are confidential, the image files and the HTML files stored in the ROM 102 may be deleted by the CPU 101 after the elapse of a predetermined time. The timing of the file deletion is not limited to this, but may be at the time of cancellation of the setting of disclosing the contents of the projection image, for example. Otherwise, the files may be stored, not in the ROM 102, but in the RAM 103 so as to be deleted when the power is turned off. Also, from the standpoint of protection of confidentiality, setting may be made to ask for a password to access the files.

As described above, the image processing apparatus of this embodiment can disclose the projection image to be projected by the projecting apparatus at low cost without the necessity of providing a dedicated server. For example, in the case of projecting specific electronic data for presentation by the projecting apparatus, by using the image signal converted at the time when the electronic data is input into the projecting apparatus, the projection image can be disclosed without the necessity of using a dedicated apparatus for converting the data to a universal format.

Second Embodiment

In the first embodiment described above, the projection image is stored as an image file and disclosed in response to a change of the contents of the projection image input into the projecting apparatus. In this embodiment, described will be a form of sequentially storing projection images input into the projecting apparatus and performing streaming distribution of the images as a moving image. Note that a liquid crystal projector 100 of this embodiment is assumed to have a configuration similar to that of the liquid crystal projector 100 of the first embodiment described above.

<<Disclosure Processing>>

Figure 9:
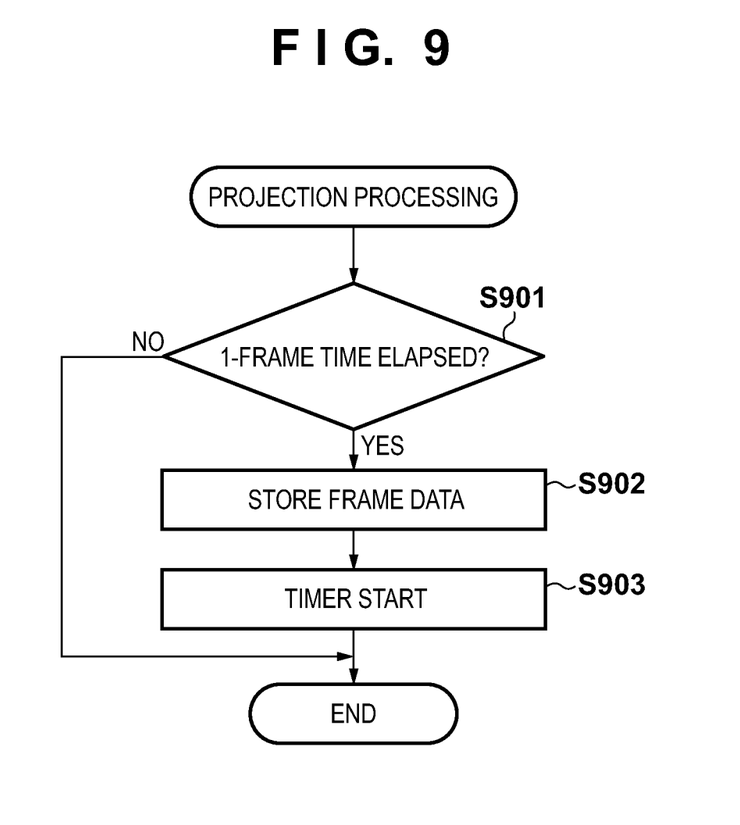
FIG. 9 is a flowchart showing an example of disclosure processing executed by a liquid crystal projector 100 of the second embodiment of the invention.

The disclosure processing performed by the liquid crystal projector 100 of this embodiment will be described hereinafter in detail with reference to FIG. 9.

In S901, after having stored a projection image corresponding to the immediately preceding frame in the ROM 102, the CPU 101 determines whether or not one frame time defined by the time interval corresponding to the frame rate at which streaming distribution is performed has elapsed. The CPU 101 shifts the processing to S902 if determining that one frame time has elapsed after the storing of the projection image corresponding to the immediately preceding frame, or completes the disclosure processing if determining that it has not elapsed.

In S902, the CPU 101 transfers the input projection image to the image processing unit 105, allowing the image processing unit 105 to subject the projection image to encoding processing according to a moving image encoding format involving streaming distribution and store the results in the ROM 102 as frame data.

In S903, the CPU 101 resets a timer for measuring the lapse of one frame time to start the measurement, and then completes the disclosure processing.

By this processing, the frame data corresponding to the input projection images are sequentially stored in the ROM 102. Note that an HTML file corresponding to a Web page that reproduces the frame data as moving images has a script for sequentially obtaining streaming moving images and reproducing the images. When such a script is executed, the external apparatus is to have a display where the display contents are sequentially changed at the frame update intervals while the apparatus is sequentially obtaining the frame data.

As for the streaming distribution of moving images described above, some browsing external terminals may not have the capability of reproducing moving images. For this reason, the liquid crystal projector 100 may be configured so that the HTML files to be disclosed can be switched, by setting, between the HTML files for displaying image files as in the first embodiment and the HTML files for reproducing streaming-distributed moving images. Alternatively, it may be configured to perform both types of disclosure processing in the first and second embodiments and disclose both types of HTML files to be accessible by external apparatuses. The image files and the HTML files may be stored, not in the ROM 102, but in the RAM 103.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-021796, filed Feb. 6, 2013, which is hereby incorporated by reference herein in its entirety.

What is claimed is:

1. A communication apparatus comprising:
   an input interface that obtains a projection image to be projected by a projector;
   at least one processor; and
   a memory storing a program, which when executed, causes the at least one processor to
   control storing in the memory the obtained projection image; and
   to function as:
   a generating unit that generates distribution data for distributing the stored projection image to an external apparatus;
   a detecting unit that detects a change of the contents of the obtained projection image;
   a distributing unit that, when a change from a first projection image to a second projection image has been detected by the detecting unit, makes second distribution data based on the second projection image available to an external apparatus;
   a determining unit that determines whether the second distribution data has already been made available to the external apparatus, when a change from the first projection image to the second projection image is detected by the detecting unit; and
   a control unit that, when the determining unit determines that the second distribution data has already been made available by the distributing unit, controls not to make available data based on the second projection image as new distribution data to the external apparatus;
   wherein the at least one processor further functions as a setting unit that sets whether or not to make available the second distribution data by the distributing unit; and
   wherein, in a case where the setting unit sets not to make available the second distribution data, the control unit controls not to store the second projection image even when a change from the first projection image to the second projection image has been detected by the detecting unit.

2. The communication apparatus of claim 1, wherein, when generating the second distribution data, the generating unit adds link information to first distribution data based on the first projection image to the second distribution data.

3. The communication apparatus of claim 1, wherein, when generating the second distribution data, the generating unit adds link information to the second distribution data to first distribution data based on the first projection image.

4. The communication apparatus of claim 1, wherein the projection image is obtained by capturing an image currently being projected by the projector.

5. The communication apparatus of claim 1, wherein, when a change from the first projection image to the second projection image has been detected by the detecting unit, the generating unit generates the second distribution data.

6. The communication apparatus of claim 1, wherein, when a change from the first projection image to the second projection image has been detected by the detecting unit and the second projection image has been projected for a predetermined time, the control unit controls the distributing unit to make available the second distribution data.

7. The communication apparatus of claim 1, wherein, in a case where a change from the first projection image to the second projection image has been detected by the detecting unit and the second projection image has already been stored, the control unit controls not to newly store the second projection image.

8. The communication apparatus of claim 1, wherein, in a case where a change from the projection image to the second projection image has been detected by the detecting unit and the second projection image has already been stored by the storing unit, the control unit controls the generating unit not to newly generate the second distribution data.

9. The communication apparatus of claim 1, wherein the distribution data is an HTML file.

10. The communication apparatus of claim 1, wherein the distributing unit operates as an HTTP server.

11. The communication apparatus of claim 1, further comprising a chassis,
    wherein the projector the generating unit, and the distributing unit are included in the chassis.

12. A control method for a communication apparatus, comprising:
    obtaining a projection image to be projected by a projector;
    storing the obtained projection image;
    generating distribution data for distributing the stored projection image to an external apparatus;
    detecting a change of the contents of the obtained projection image;
    when a change from a first projection image to a second projection image has been detected, making second distribution data based on the second projection image available to an external apparatus;

determining whether the second distribution data has already been made available to the external apparatus, when a change from the first projection image to the second projection image has been detected;

when it is determined that the second distribution data has already been made available, controlling not to make available data based on the second projection image as new distribution data to the external apparatus;

setting whether or not to make available the second distribution data; and in a case where the setting step sets not to make available the second distribution data, controlling not to store the second projection image even when a change from the first projection image to the second projection image has been detected in the detecting step.

13. A non-transitory computer readable recording medium storing a program for allowing a computer to execute a control method for a communication apparatus the control method comprising:

obtaining a projection image to be projected by a projector;

storing the obtained projection image;

generating distribution data for distributing the stored projection image to an external apparatus;

detecting a change of the contents of the obtained projection image;

when a change from a first projection image to a second projection image has been detected, making second distribution data based on the second projection image available to an external apparatus;

determining whether the second distribution data has already been made available to the external apparatus, when a change from the first projection image to the second projection image has been detected;

when it is determined that the second distribution data has already been made available, controlling not to make available data based on the second projection image as new distribution data to the external apparatus;

setting whether or not to make available the second distribution data; and in a case where the setting step sets not to make available the second distribution data, controlling not to store the second projection image even when a change from the first projection image to the second projection image has been detected in the detecting step.

* * * * *